United States Patent [19]

Yano et al.

[11] Patent Number: 4,510,921

[45] Date of Patent: Apr. 16, 1985

[54] LATENT HEAT ACCUMULATING GREENHOUSE

[75] Inventors: Naomichi Yano; Isao Makido; Hajime Ito, all of Osaka, Japan

[73] Assignee: Kubota Ltd., Osaka, Japan

[21] Appl. No.: 416,358

[22] PCT Filed: Mar. 8, 1982

[86] PCT No.: PCT/JP82/00064

§ 371 Date: Sep. 10, 1982

§ 102(e) Date: Sep. 10, 1982

[30] Foreign Application Priority Data

Mar. 13, 1981 [JP] Japan .................................. 56-37146

[51] Int. Cl.$^3$ ................................................ F24J 3/02
[52] U.S. Cl. .................................. 126/429; 126/400; 126/426; 126/430; 126/436; 47/17
[58] Field of Search ............... 126/430, 426, 429, 431, 126/436, 400; 47/17, 19, 29

[56] References Cited

U.S. PATENT DOCUMENTS

| | | | |
|---|---|---|---|
| 3,960,205 | 6/1976 | Laing | 126/400 X |
| 3,964,678 | 6/1976 | O'Hanlon | 126/429 |
| 3,990,635 | 11/1976 | Restle et al. | 126/429 X |
| 4,212,292 | 7/1980 | Reinert | 126/429 X |
| 4,290,416 | 9/1981 | Maloney | 126/400 X |
| 4,306,542 | 12/1981 | Reinert | 126/429 |
| 4,421,101 | 12/1983 | Stice | 126/400 X |

FOREIGN PATENT DOCUMENTS

| | | | |
|---|---|---|---|
| 2452068 | 11/1980 | France | 126/429 |
| 14140 | 7/1975 | Japan | 126/429 |
| 129742 | 11/1976 | Japan | 126/430 |
| 37858 | 9/1979 | Japan | 126/430 |

*Primary Examiner*—Samuel Scott
*Assistant Examiner*—Kenichi Okuno
*Attorney, Agent, or Firm*—Koda and Androlia

[57] ABSTRACT

This invention relates to a latent heat accumulating greenhouse utilizing solar heat. The object of the invention is to provide a greenhouse which is simple in construction, of high efficiency for heat absorbing and capable of much absorbing and accumulating of heat. A heat accumulating chamber (B) partitioned by transparent sheets (1) is provided between the attic and a floor surface facing north in the greenhouse (A). A blower fan (2) is disposed to confront an opening (1a) provided at the lower portion in said heat accumulating chamber (B). Also, in the heat accumulating chamber (B), a heat accumulating unit (3) having a large number of light transmitting windows (32) and enclosing a phase transformation heat accumulating material (33) such as $CaCl_2.6H_2O$, $Na_2SO_4.10H_2O$ therein is detachably suspended in a position close to windowpanes at the north side.

1 Claim, 3 Drawing Figures

4,510,921

LATENT HEAT ACCUMULATING GREENHOUSE

TECHNICAL FIELD

The present invention relates to latent heat accumulating greenhouse utilizing solar heat which can save fuel cost for heating.

BACKGROUND OF THE INVENTION

Conventionally, the greenhouse is heated by the solar heat during shining hours, but during the nighttime and rainy weather, the greenhouse should be heated by the electric heat, hot water etc. according to falling outdoor temperature, thus requiring high fuel cost.

SUMMARY OF THE INVENTION

Subsequently, according to the latent heat accumulating greenhouse of the present invention, a heat accumulating chamber partitioned by transparent sheets is provided between the attic and a floor surface facing north in the greenhouse, and a blower fan is disposed to confront an opening provided at the lower portion in said heat accumulating chamber, while, in the heat accumulating chamber, a heat accumulating unit having a large number of light transmitting windows and enclosing a phase transformation heat accumulating material therein is detachably suspended in a position close to windowpanes at the north side. Therefore, the arrangement is such that solar heat during shining hours is introduced into the narrow heat accumulating chamber for accumulation of heat by the use of the phase transformation heat accumulating material, and the heat thus accumulated is discharged during the period in which the external atmospheric temperature has fallen. By the arrangement of the present invention as described above, the high heat absorbing efficiency may be achieved through simple construction, and a large amount of endothermic heat accumulation can be effected. Owing to the above, heating by heat radiation may be continued for a long period of time, and therefore, only an extremely small amount of auxiliary heat is necessary, with a consequent saving of fuel cost to a large extent.

The heat accumulating chamber B is created facing north in the greenhouse, then the sun's ray coming from the south are utilized to warm the main parts of the greenhouse. Also, the south side of the accumulating chamber B is partitioned by a transparent sheet 1 and the heat is accumulated in the chamber B by a part of the sun's rays.

The heat accumulating unit comprises a rectangular flat bag-like container of flexible material which is partitioned into a plurality of sections by check-like pattern heat seals. Then not only the movement of the medium within the container is restricted, but even if the container should be broken, the amount of medium flowing out would be limited to a minimum.

Furthermore, the high temperature air at the upper part of the greenhouse is led to the heat accumulating chamber B through a duct 6. As a result the heat accumulating effect is further improved.

BEST MODES FOR EFFECTING THE PRESENT INVENTION

The present invention will be described in more detail hereinbelow with reference to the accompanying drawings.

Figure 1:
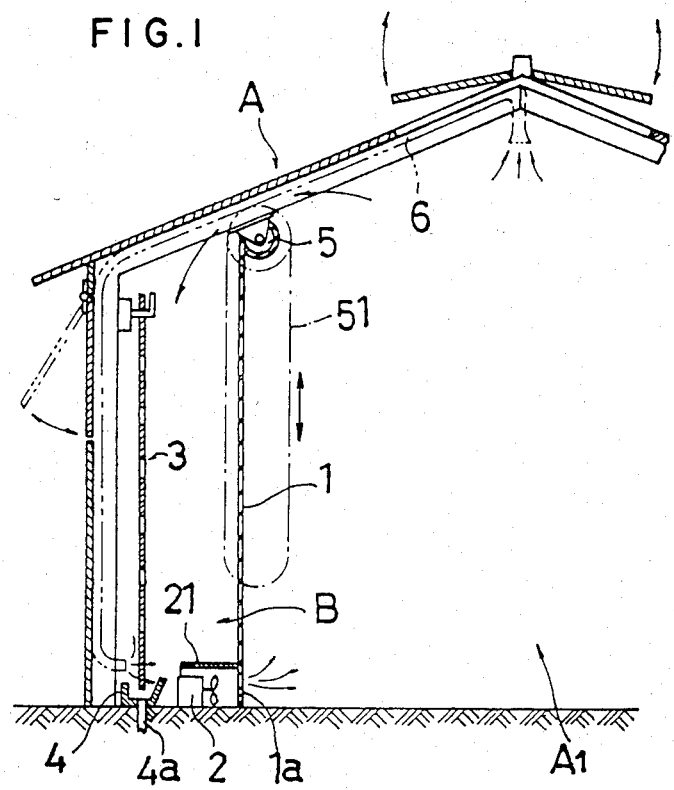
FIG. 1 is a longitudinal sectional view showing an essential portion of a latent heat accumulating greenhouse according to one preferred embodiment of the present invention.

In FIG. 1, the greenhouse A has a heat accumulating chamber B provided in its interior facing the north side. The heat accumulating chamber B is created by a transparent plastic sheet 1 which can be rolled up. A small gap exists between the top of the transparent plastic sheet 1 and the roof. At the lower portion of the heat accumulating chamber B, there is disposed at least one blower fan 2, which confronts at least one opening 1a provided at a skirt portion of the plastic sheet 1 so as to feed air inside the heat accumulating chamber B into a greenhouse main portion $A_1$ through said opening 1a. Moreover, in the vicinity of window panes facing the north side in the heat accumulating chamber B, a heat accumulating member 3 generally covering the entire area thereof is suspended in the form of a curtain.

Figure 2:
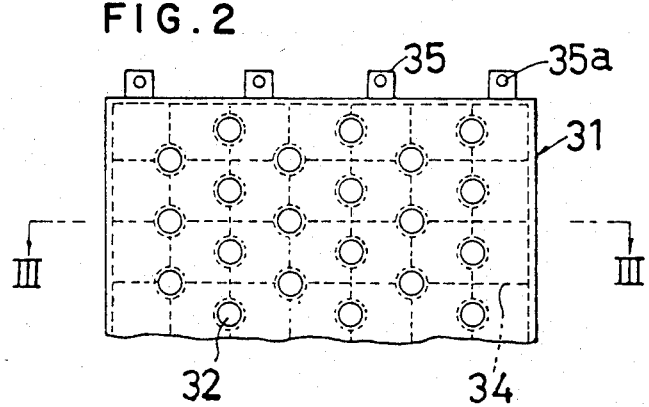
FIG. 2 is a front elevational view of a heat accumulating member employed in the arrangement of FIG. 1.
Figure 3:
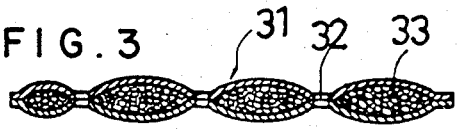
FIG. 3 is a cross section taken along the line III—III of FIG. 2.

As shown in FIGS. 2 and 3, the heat accumulating member 3 as described above is composed of a bag-like main body 31 employing a plastic film and formed with a large number of circular windows 32. The windows 32 referred to above are useful for transmitting light rays therethrough. In the above bag-like main body 31, the phase transformation heat accumulating medium 33 such as $CaCl_2.6H_2O$, etc., is enclosed. $CaCl_2.6H_2O$ as described above produces a reaction as follows at temperatures of 27° to 30° C.

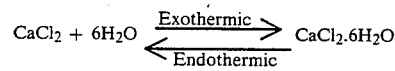

Meanwhile, the interior of the bag-like main body 31 is partitioned into a check-like pattern by heat seals 34 so as to be divided into many sections. By the above internal partitions, not only the movement of the medium within the main body 31 is restricted, but even if the bag-like main body 31 should be broken, the amount of medium flowing out may be limited to a minimum. At the side edge portion of the bag-like main body 31, a plurality of tongue pieces 35 having holes 35a for hanging said main body 31 are formed.

On the other hand, on the ground below the suspended bag-like main body 31, a trough member 4 provided with a discharge pipe 4a is installed for preventing the harmful substance in the bag-like main body 31 from being diffused into the greenhouse, if the main body 31 should be damaged.

The transparent plastic sheet 1 is provided in the attic inside the greenhouse, and is arranged to be freely wound up or lowered by a winch 5 to be rotated by a chain 51.

Hereinbelow, a mode of operation of the greenhouse according to the present invention will be described.

During shining hours, the temperature within the greenhouse A is raised by receiving solar heat. Upon actuation of the blower fan 2 inside the heat accumulating chamber B, air heated up to a high temperature by direct contact with the roof is drawn into said heat accumulating chamber B through the gap between the transparent plastic sheet 1 and the roof thereover. When the temperature within the greenhouse reaches over 30° C., the phase transformation heat accumulating medium 33 within the heat accumulating member 3 absorbs heat to be decomposed for the heat accumulation. Thus, cool air deprived of heat is returned into the greenhouse main portion $A_1$ through the opening at the skirt portion of the transparent plastic sheet 1.

During night time and rainy weather, when the temperature within the greenhouse falls below 27° to 30° C., $CaCl_2$ being decomposed within the bag-like main body 31 is combined with water to produce heat for heat radiation into the heat accumulating chamber B, while following the functioning of the lower fan 2, the warm air within the heat accumulating chamber B is fed into the greenhouse main portion $A_1$ for heating. Accordingly, during heat radiation by the phase transformation heat accumulating material 33, no other heating is required at all. Therefore, it is sufficient for the purpose, if heating by other means is used only for a short period during very cold seasons or when rainy weather continues for a long period, etc. In the drawing, a blower fan casing is indicated at numeral 21. For the heat accumulating medium, following substances may be employed besides the above.

| Kind of medium | Melting temperature |
| --- | --- |
| $Na_2SO_4.10H_2O$ | approximately 32° C. |
| $Na_2SO_3.5H_2O$ | approximately 48° C. |
| Paraffin | approximately 46° C. |

Since the heat accumulating member 3 can be readily detached, it is removed for storing during the period when heat accumulation is not necessary. Meanwhile, if the transparent plastic sheet 1 is kept wound up, the heat accumulating chamber B may also be used as the greenhouse main portion $A_1$.

According to the present invention as described so far, since the heat accumulating chamber B partitioned by the transparent plastic sheet 1 and capable of being subjected to air circulation is provided at the portion facing the north side in the greenhouse A, while, in the heat accumulating chamber, the heat accumulating member 31 in which the phase transformation heat accumulating medium 33 is enclosed, is detachably suspended, air circulation between the greenhouse main portion $A_1$ and the heat accumulating chamber B may be effected, without obstructing the heat reception for the greenhouse main portion $A_1$, so that the heat accumulating member 3 absorbs heat at high efficiency for the heat accumulation. Moreover, owing to the fact that the heat accumulating member 3 has a large area, the amount of heat accumulation thereof is also large, and consequently, its duration during heat radiation is also sufficiently long. Furthermore, since the heat accumulating member 3 has many light transmitting windows 32, there is no possibility that light is intercepted thereby. Additionally, the heat accumulating chamber B may readily be converted into the greenhouse main portion $A_1$, if the transparent plastic seal 1 is wound up.

Furthermore, if the high temperature are at the upper part of the greenhouse is led to the lower portion within the heat accumulating chamber B through a duct 6, the heat accumulating effect can further be improved.

What is claimed is:

1. A latent heat accumulating greenhouse, wherein a heat accumulating chamber is created by a transparent sheet provided between a top and a floor surface on the north side in the greenhouse, and a blower fan is disposed to confront an opening provided at the lower portion of said heat accumulating chamber, while, in the heat accumulating chamber, a heat accumulating unit in the form of a bag-like member is positioned, said heat accumulating unit having a large number of light transmitting windows and enclosing a phase transformation heat accumulating material therein, said heat accumulating unit is detachably suspended in a position close to the window panes at the north side of the greenhouse, the heat accumulating unit comprises a rectangular flat bag-like container of flexible material which is partitioned into a plurality of sections by checklike pattern heat seals, and a duct is provided in the greenhouse to lead the high temperature air at the upper part of the greenhouse into the heat accumulating chamber.

* * * * *